United States Patent [19]

Schwarz

[11] 4,370,440

[45] Jan. 25, 1983

[54] COMPOSITIONS COMPRISING CHLOROSULPHONATED POLYETHYLENE, CARBOXYLATED BUTADIENE-ACRYLONITRILE AND MAGNESIUM OXIDE USEFUL FOR LINERS OR MEMBRANES

[75] Inventor: Herbert F. Schwarz, Sarnia, Canada

[73] Assignee: Polysar Limited, Sarnia, Canada

[21] Appl. No.: 195,253

[22] Filed: Oct. 8, 1980

[30] Foreign Application Priority Data

Nov. 9, 1979 [CA] Canada .................................. 339502

[51] Int. Cl.$^3$ .......................... C08L 33/02; C08K 3/22
[52] U.S. Cl. .................................... 524/522; 524/433; 525/221
[58] Field of Search ...................... 260/42.47; 525/221; 524/522

[56] References Cited

U.S. PATENT DOCUMENTS 3,790,646  2/1974  Ohishi et al. .......................... 521/221
3,989,441  11/1976  Bell et al. ............................ 428/441
4,013,817  3/1977  Masuda et al. ....................... 428/418

FOREIGN PATENT DOCUMENTS 49-11941  2/1974  Japan .................................... 525/221
1164516   9/1969  United Kingdom .
1474230   5/1977  United Kingdom .
2025428   1/1980  United Kingdom ................ 523/400
2062653   5/1981  United Kingdom .

OTHER PUBLICATIONS

Derwent Abs. 63885B/35 (7-20-79), Toke (J54091543).
Derwent Abs. 12802W/08 (1-16-75), Thoh (BE-820170).

Primary Examiner—Paul Lieberman
Assistant Examiner—Herbert J. Lilling
Attorney, Agent, or Firm—Stevens, Davis, Miller & Mosher

[57] ABSTRACT

Improved compositions, and liners and membranes produced therefrom, are provided which comprise a mixture of chlorosulphonated polyethylene and carboxylated butadiene-acrylonitrile polymer. Such compositions have use as improved liners and membranes for reservoirs and pits or ponds.

4 Claims, No Drawings

COMPOSITIONS COMPRISING CHLOROSULPHONATED POLYETHYLENE, CARBOXYLATED BUTADIENE-ACRYLONITRILE AND MAGNESIUM OXIDE USEFUL FOR LINERS OR MEMBRANES

The present invention is directed to improved compositions based on blends of chlorosulphonated polyethylene and carboxylated butadiene-acrylonitrile polymers and especially to such blends when used as a lining material for reservoirs and pits or ponds.

It is well known in the art that reservoirs, especially for storage of water, and pits or ponds, especially for storage of waste liquid materials, and associated canals or connection facilities may be lined, in one way or another, with a membrane or liner and that such membranes or liners usually are based on polymeric materials. Such polymeric materials are generally selected from polyvinyl chloride, polyethylene, chlorinated polyethylene, butyl rubber, EPDM rubber, polychloroprene rubber and chlorosulphonated polyethylene. Of these materials, chlorosulphonated polyethylene is extensively used except where aromatic hydrocarbons, oxygenated hydrocarbons and oil and gasoline may be encountered. The presence of even small amounts of such hydrocarbons in an aqueous mixture can, on contact with a chlorosulphonated polyethylene liner of a holding pond, cause swelling and ultimately failure of the liner. This deficiency of liners or membranes constructed from chlorosulphonated polyethylene has limited the utility of such liners.

The present invention is directed to a means of significantly reducing the above noted deficiency of chlorosulphonated polyethylene liners or membranes. This deficiency reduction is achieved by mixing with the chlorosulphonated polyethylene a minor amount of a carboxylated butadiene-acrylonitrile polymer and the use of this mixture for the manufacture of the liner or membrane.

Accordingly, it is an object of this invention to provide an improved composition comprising a blend of chlorosulphonated polyethylene and carboxylated butadiene-acrylonitrile polymer.

It is a further object of this invention to provide an improved liner or membrane for use in lining of reservoirs, pits or ponds, wherein said improved liner or membrane comprises a blend of chlorosulphonated polyethylene and carboxylated butadiene-acrylonitrile polymer.

According to the invention, there is provided an improved composition comprising from about 90 to about 55 parts by weight of chlorosulphonated polyethylene and from about 10 to about 45 parts by weight of carboxylated butadiene-acrylonitrile polymer, said chlorosulphonated polyethylene containing from about 38 to about 42 weight percent of chlorine and from about 0.9 to about 1.1 weight percent of sulphur and said carboxylated butadiene-acrylonitrile polymer containing from about 30 to about 40 weight percent of acrylonitrile and from about 5 to about 10 weight percent of an unsaturated carboxylic acid monomer.

According to a further aspect of the invention, there is provided an improved liner or membrane composition comprising from about 90 to about 55 parts by weight of chlorosulphonated polyethylene and from about 10 to about 45 parts by weight of a carboxylated butadiene-acrylonitrile polymer, from about 40 to about 80 parts by weight of carbon black per 100 parts by weight of chlorosulphonated polyethylene plus carboxylated butadiene-acrylonitrile polymer and sufficient vulcanizing agent to cause the composition to cure during use.

According to a still further aspect of the invention, there is provided an improved liner or membrane composition in the form of a sheet supported on a nylon or polyester fibre scrim, said composition comprising from about 90 to about 55 parts by weight of chlorosulphonated polyethylene and from about 10 to about 45 parts by weight of a carboxylated butadiene-acrylonitrile polymer, filler selected from about 40 to about 80 parts by weight of carbon black and from about 30 to about 60 parts by weight of carbon black plus from about 10 to about 20 parts by weight of mineral filler and sufficient vulcanizing agent to cause the composition to cure during use, said parts being per 100 parts by weight of polymers.

Chlorosulphonated polyethylene is well known in the industry as a polyethylene which has been chemically modified such as to contain from about 25 to about 43, and preferably for use in this invention from about 38 to about 42 weight percent of chlorine and from about 0.9 to about 1.4, and preferably for use in the present invention from about 0.9 to about 1.1 weight percent of sulphur. It is a solid polymer having a molecular weight, as described by the Mooney, of from about 30 up to about 80 and preferably for use in the present invention from about 35 to about 55, the Mooney being ML-4 at 100° C. The polymer has excellent heat aging and ozone resistance.

When chlorosulphonated polyethylene is used as the sole polymeric component of a liner or membrane, it is usually supplied as an unvulcanized sheet which contains sufficient vulcanizing agent to cause the sheet to slowly cure in situ, such curing thought to be due to the action of moisture and heat or ultra-violet light. In order to provide improved strength characteristics, and especially improved tear and puncture resistance, the sheet is frequently supplied supported on a nylon or polyester fibre scrim. Typical vulcanizing systems include the presence of a magnesium or lead oxide, preferably a magnesium oxide for toxicological reasons, and optionally a sulphur containing accelerator such as mercaptobenzothiazole, benzothiazyl disulphide or dipentamethylene thiuram tetrasulphide.

Carboxylated butadiene-acrylonitrile polymers are well known in the industry and contain from about 25 to about 30, preferably from about 26 to about 28, weight percent of acrylonitrile and from about 5 to about 10 weight percent of an unsaturated carboxylic acid monomer, the balance being butadiene. They are solid polymers having a molecular weight, as described by the Mooney (ML-4 at 100° C.), of from about 45 to about 70.

The compositions of the invention may also contain fillers, such as carbon black or carbon black-mineral filler mixtures, various processing aids such as plasticizers and softeners and antioxidants. Carbon black, when present, may be from about 40 to about 80 parts by weight per 100 parts by weight of polymers and when present as a carbon black-mineral filler mixture may be from about 30 to about 60 parts by weight plus about 10 to about 20 parts by weight of mineral filler per 100 parts by weight of polymers. Processing aids may include the well known plasticizers and softeners such as low molecular weight polyethylene, the aromatic hydrocarbon resins, polyethylene glycol and aromatic hydrocarbon oils. Antioxidants may be readily selected from among those well known in the art.

When the compositions of the invention contain vulcanizing agents, such agents may include magnesium oxide or lead oxide and preferably a high activity magnesium oxide for toxicological reasons, and optionally one or more sulphur-containing accelerators such as mercaptobenzothiazole, benzothiazyl disulphide or dipentamethylene thiuram tetrasulphide. When magnesium oxide is present the amount will generally be from about 3 to about 7 parts by weight, for lead oxide from about 10 to about 30 parts by weight, and for the sulphur-containing accelerators from about 0.5 up to about 3 parts by weight, all parts by weight being per 100 parts by weight of polymers.

The compositions of the invention may be supported on nylon or polyester fibre scrim to improve the strength characteristics of a linear or membrane prepared from such compositions. Such liners or membranes will generally be from about 0.25 mm (ie. 10 mil) to about 1.78 mm (ie. 70 mil), preferably from about 0.375 mm (ie. 15 mil) to about 1.14 mm (ie. 45 mil) in thickness. Such a scrim can be readily incorporated during a calendring operation which preferably allows the composition to adhere to itself through the interstices of the scrim weave.

Whereas liners or membranes based on chlorosulphonated polyethylene as the only polymeric constituent may not be used in contact with aromatic hydrocarbons and oxygenated hydrocarbons due to poor resistance to these materials, the compositions of the present invention exhibit marked improvement in their resistance to especially aromatic hydrocarbons and to oxygenated hydrocarbons. If an effluent holding basin is equipped with a liner containing chlorosulphonated polyethylene and the effluent contains residual hydrocarbons, especially aromatic hydrocarbons, softening and puckering of the liner will occur, especially at the effluent surface—liner interface. In contrast, if such an effluent holding basin is equipped with a liner having a composition according to the invention, very little softening and puckering of the liner will occur.

The following examples are provided to illustrate the scope of the invention. All parts are parts by weight.

EXAMPLE 1

Compounds were prepared according to the recipes shown in Table I. Using a Model B laboratory Banbury with the rotors at 77 rpm, pre-heated to 70° C. and the cooling water on, the chlorosulphonated polyethylene (HYPALON®40) and carboxylated butadiene-acrylonitrile rubber (KRYNAC®221) were added at zero time, the aromatic hydrocarbon resin (KENFLEX®DA), the polyethylene (AC 617 A) and half the carbon black (N 660 type) were added at 1 minute and the remaining ingredients (magnesium oxide MAGLITE®D, polyethylene glycol CARBOWAX®4000, amine activator ARMEEN®T and antioxidant nickel dibutyl dithiocarbamate) were added at 2.5 minutes. The compound was dumped at 5 minutes and sheeted off a warm (60° C.) mill.

Using ASTM procedures, the data shown in Table I were determined, the ozone resistance being determined on a looped sample with an ozone concentration of 50 pphm after exposure at 40° C. for 168 hours.

In order to assess within a reasonable time period the aging and hydrocarbon resistance of the compounded sheets, accelerated aging tests were used as shown in Table II.

TABLE I

| | | Experiment # | | | |
|---|---|---|---|---|---|
| | | 1 | 2 | 3 | 4 |
| Chlorosulphonated polyethylene | | 100 | 85 | 70 | 55 |
| Carboxylated butadiene-acrylonitrile polymer | | — | 15 | 30 | 45 |
| Carbon black | | 70 | 70 | 70 | 70 |
| Polyethylene | | 3 | 3 | 3 | 3 |
| Aromatic hydrocarbon resin | | 15 | 15 | 15 | 15 |
| Magnesium oxide | | 5 | 5 | 5 | 5 |
| Polyethylene glycol | | 1 | 1 | 1 | 1 |
| Amine activator | | 0.5 | 0.5 | 0.5 | 0.5 |
| Antioxidant | | 1 | 1 | 1 | 1 |
| Properties | | | | | |
| Hardness | Shore A | 77 | 76 | 75 | 76 |
| 100% Modulus | MPa | — | 9.3 | 13.1 | 10.8 |
| Tensile strength | MPa | 7.2 | 12.3 | 14.9 | 13.4 |
| Elongation | % | 360 | 210 | 160 | 170 |
| Tear (Die C) | kN/m | 57 | 57 | 41.5 | 46 |
| Ozone resistance | | NO CRACKS VISIBLE | | | |

TABLE II

| Accelerated Aging | | | | | |
|---|---|---|---|---|---|
| | | Experiment # | | | |
| | | 1 | 2 | 3 | 4 |
| Aged in hot air-168 hours at 100° C. | | | | | |
| Hardness | Shore A | 74 | 69 | 67 | 68 |
| 100% Modulus | MPa | 12.6 | 15.9 | 18.3 | 18.2 |
| Tensile strength | MPa | 20.2 | 24.5 | 25.5 | 26.8 |
| Elongation | % | 230 | 180 | 140 | 150 |
| Aged in ASTM Fuel B-168 hours at room temperature (25° C.) | | | | | |
| Hardness | Shore A | * | — | — | — |
| 100% Modulus | MPa | * | 0.2 | 0.7 | 1.2 |
| Tensile strength | MPa | * | 0.5 | 1.2 | 2.2 |
| Elongation | % | * | 210 | 120 | 170 |
| Volume change | % | * | 0 | 0 | 0 |

*Sample disintegrated.

EXAMPLE 2

Following the procedure outlined in Example 1, the compounds shown in Table III were prepared for evaluation as sheets. The aromatic extender was SUNDEX®53. The characteristics of the sheet materials are also shown in Table III.

Accelerated aging test data are shown in Table IV.

From the results for both of Examples 1 and 2, in which experiment numbers 1, 10 and 11 are controls, it is clear that compositions according to the invention exhibit good strength characteristics, especially when magnesium oxide is present, show improved resistance to ASTM Fuel B which is a high aromatic oil, and show the characteristic of property improvement after aging.

TABLE III

| | Experiment # | | | | | | |
|---|---|---|---|---|---|---|---|
| | 10 | 11 | 12 | 13 | 14 | 15 | 16 |
| Chlorosulphonated polyethylene | 100 | 100 | 85 | 85 | 70 | 70 | 55 |

TABLE III—Continued

| | | Experiment # | | | | | | |
|---|---|---|---|---|---|---|---|---|
| | | 10 | 11 | 12 | 13 | 14 | 15 | 16 |
| Carboxylated butadiene-acrylonitrile polymer | | — | — | 15 | 15 | 30 | 30 | 45 |
| Carbon black | | 70 | 70 | 70 | 70 | 70 | 70 | 70 |
| Polyethylene | | 3 | 3 | 3 | 3 | 3 | 3 | 3 |
| Aromatic hydrocarbon resin | | 15 | 15 | 15 | 15 | 15 | 15 | 15 |
| Magnesium oxide | | 5 | — | 5 | — | 5 | — | 5 |
| Polyethylene glycol | | 1 | 1 | 1 | 1 | 1 | 1 | 1 |
| Amine activator | | 0.5 | 0.5 | 0.5 | 0.5 | 0.5 | 0.5 | 0.5 |
| Antioxidant | | 1 | 1 | 1 | 1 | 1 | 1 | 1 |
| Aromatic extender | | 8 | 8 | 8 | 8 | 8 | 8 | 8 |
| Properties | | | | | | | | |
| Hardness | Shore A | 77 | 69 | 72 | 70 | 68 | 65 | 65 |
| 100% Modulus | MPa | 3.1 | 1.8 | 5.9 | 1.6 | 6.1 | 1.7 | 8.2 |
| 300% Modulus | MPa | 7 | 3.5 | — | 3.6 | — | 4.1 | — |
| Tensile strength | MPa | 7.6 | 3.5 | 12.7 | 3.7 | 15.6 | 4.1 | 15.4 |
| Elongation | % | 360 | 380 | 240 | 410 | 230 | 360 | 170 |
| Tear (Die C) | kN/m | 87 | 65 | 53 | 72 | 54 | 67 | 50 |

TABLE IV

| | | Experiment # | | | | | | |
|---|---|---|---|---|---|---|---|---|
| Aging Data | | 10 | 11 | 12 | 13 | 14 | 15 | 16 |
| A. Aged at room temperature (25° C.) for 2 weeks. | | | | | | | | |
| Hardness | Shore A | 73 | 72 | 73 | 70 | 73 | 67 | 67 |
| 100% Modulus | MPa | 3.8 | 1.9 | 10.4 | 2.2 | 9.3 | 1.9 | 11.3 |
| 300% Modulus | MPa | 8 | 2.8 | — | 4.9 | — | 4.3 | — |
| Tensile strength | MPa | 8.4 | 2.8 | 14.7 | 5.2 | 18.9 | 4.5 | 18.6 |
| Elongation | % | 380 | 330 | 200 | 330 | 200 | 380 | 170 |
| B. Aged at room temperature (25° C.) for 4 weeks. | | | | | | | | |
| Hardness | Shore A | 71 | 68 | 72 | 68 | 71 | 64 | 70 |
| 100% Modulus | MPa | 4.7 | 2.4 | 10.6 | 3 | 12.2 | 2.4 | 16.3 |
| 300% Modulus | MPa | 11.8 | 4.5 | — | 6 | — | 5.1 | — |
| Tensile strength | MPa | 12.2 | 4.5 | 18 | 6.1 | 23 | 5.2 | 21.6 |
| Elongation | % | 350 | 350 | 200 | 400 | 200 | 380 | 150 |
| C. Aged at 125° C. for 168 hours. | | | | | | | | |
| Hardness | Shore A | 81 | 80 | 77 | 67 | 75 | 76 | 75 |
| 100% Modulus | MPa | 13.4 | 7.8 | 17.2 | 12.7 | — | — | — |
| Tensile strength | MPa | 17.4 | 12.7 | 17.2 | 13.2 | 16.7 | 15.7 | 16.2 |
| Elongation | % | 200 | 230 | 110 | 130 | 40 | 70 | 20 |
| D. Aged in ASTM Fuel B 168 hours at room temperature (25° C.). | | | | | | | | |
| Hardness | Shore A | * | * | 17 | ND | 35 | ND | 31 |
| 100% Modulus | MPa | * | * | 1.3 | ND | 2.4 | ND | 2.9 |
| Tensile strength | MPa | * | * | 2.4 | ND | 4.3 | ND | 3.8 |
| Elongation | % | * | * | 220 | ND | 180 | ND | 140 |
| Volume change | % | * | * | −22.5 | −31 | −19 | −12.5 | −28 |

*Sample disintegrated
ND—Not determined

What is claimed is:

1. An improved liner or membrane composition characterized in that it comprises from about 90 to about 55 parts by weight of chlorosulphonated polyethylene and from about 10 to about 45 parts by weight of carboxylated butadiene-acrylonitrile polymer, for a total of 100 parts by weight of polymers, said chlorosulphonated polyethylene containing from about 38 to about 42 weight percent of chlorine and from about 0.9 to about 1.1 weight percent of sulphur and said carboxylated butadiene-acrylonitrile polymer being a solid polymer having a Mooney (ML 1+4 at 100° C.) of from about 45 to about 70 and containing from about 25 to about 30 weight percent of acrylonitrile and from about 5 to about 10 weight percent of an unsaturated carboxylic acid monomer, and said composition also contains, per 100 parts by weight of polymers, from about 3 to about 7 parts by weight of magnesium oxide.

2. The composition of claim 1 characterized in that it also contains, per 100 parts by weight of polymers, from about 40 to about 80 parts by weight of carbon black or from about 30 to about 60 parts by weight of carbon black plus from about 10 to about 20 parts by weight of mineral filler.

3. The composition of claim 2 characterized in that it also contains, per 100 parts by weight of polymers, from about 0.5 to about 3 parts by weight of sulphur containing accelerator.

4. The composition of claim 3 characterized in that the sulphur containing accelerator is one or more of mercaptobenzothiazole, benzothiazyl disulphide and dipentamethylene thiuram tetrasulphide.

* * * * *